(12) United States Patent  
Marion

(10) Patent No.: US 12,370,880 B2  
(45) Date of Patent: Jul. 29, 2025

(54) ENGINE SUPPORT SYSTEM AND METHOD

(71) Applicant: VOLVO TRUCK CORPORATION, Gothenburg (SE)

(72) Inventor: Shawn Marion, Ridgeway, VA (US)

(73) Assignee: VOLVO TRUCK CORPORATION, Gothenburg (SE)

( * ) Notice: Subject to any disclaimer, the term of this patent is extended or adjusted under 35 U.S.C. 154(b) by 345 days.

(21) Appl. No.: 18/135,488

(22) Filed: Apr. 17, 2023

(65) Prior Publication Data

US 2024/0343104 A1   Oct. 17, 2024

(51) Int. Cl.
*B60K 5/12* (2006.01)
*B66F 7/14* (2006.01)

(52) U.S. Cl.
CPC .............. *B60K 5/1283* (2013.01); *B66F 7/14* (2013.01)

(58) Field of Classification Search
CPC ............ B60K 5/1283; B60K 5/12; B66F 7/14
See application file for complete search history.

(56) References Cited

U.S. PATENT DOCUMENTS

| | | | | |
|---|---|---|---|---|
| 2,865,585 A * | 12/1958 | Beyer | ........................ | B60S 5/00 29/256 |
| 3,012,771 A | 12/1961 | Wudel | | |
| 3,306,601 A * | 2/1967 | Mitchell | .............. | B25H 1/0007 269/50 |
| 3,353,771 A * | 11/1967 | Bow | ...................... | B60K 5/125 248/694 |
| 4,804,162 A * | 2/1989 | Rice | ...................... | F16M 11/046 248/129 |
| 4,932,628 A * | 6/1990 | Pacheco | ................... | F16M 3/00 248/676 |
| 5,372,353 A * | 12/1994 | West | ..................... | B25H 1/0007 254/DIG. 16 |

(Continued)

FOREIGN PATENT DOCUMENTS

| | | |
|---|---|---|
| DE | 3732837 A1 | 4/1989 |
| EP | 2784019 A1 | 10/2014 |

(Continued)

OTHER PUBLICATIONS

European Search Report (Jul. 16, 2024) for corresponding European App. EP 24159930.7.

*Primary Examiner* — John D Walters
(74) *Attorney, Agent, or Firm* — WRB-IP PLLC

(57) ABSTRACT

Aspects of the disclosure relate to an engine support system and method. The engine support system includes a frame mounted engine support and at least one engine mounted coupler. The engine support includes a frame mount with an elongated body and opposing arms slidably disposed on the elongated boy for releasably engaging a frame of a vehicle, and at least one jack assembly. Each jack assembly includes a collar coupled to and horizontally movable along the elongated body, and a jack rod coupled to and vertically movable relative to the collar. The jack rod includes a ball mount configured to insert into the coupler at an underside of an engine block of the vehicle. Each jack assembly is configured to support and/or lift the engine block relative to the vehicle frame by vertical movement of the ball mount into the coupler and relative to the frame mount engaged with the vehicle frame.

31 Claims, 10 Drawing Sheets

(56) References Cited

U.S. PATENT DOCUMENTS

| | | | | |
|---|---|---|---|---|
| 6,120,236 A | * | 9/2000 | Smith | B66C 23/485 |
| | | | | 414/917 |
| 6,122,811 A | * | 9/2000 | Shirley | B25B 11/02 |
| | | | | 254/133 R |
| 2012/0102704 A1 | | 5/2012 | Barrios et al. | |
| 2019/0291803 A1 | | 9/2019 | Hart | |
| 2022/0332182 A1 | | 10/2022 | Marion | |

FOREIGN PATENT DOCUMENTS

| | | |
|---|---|---|
| GB | 415271 | 8/1934 |
| WO | 2021101573 A1 | 5/2021 |

* cited by examiner

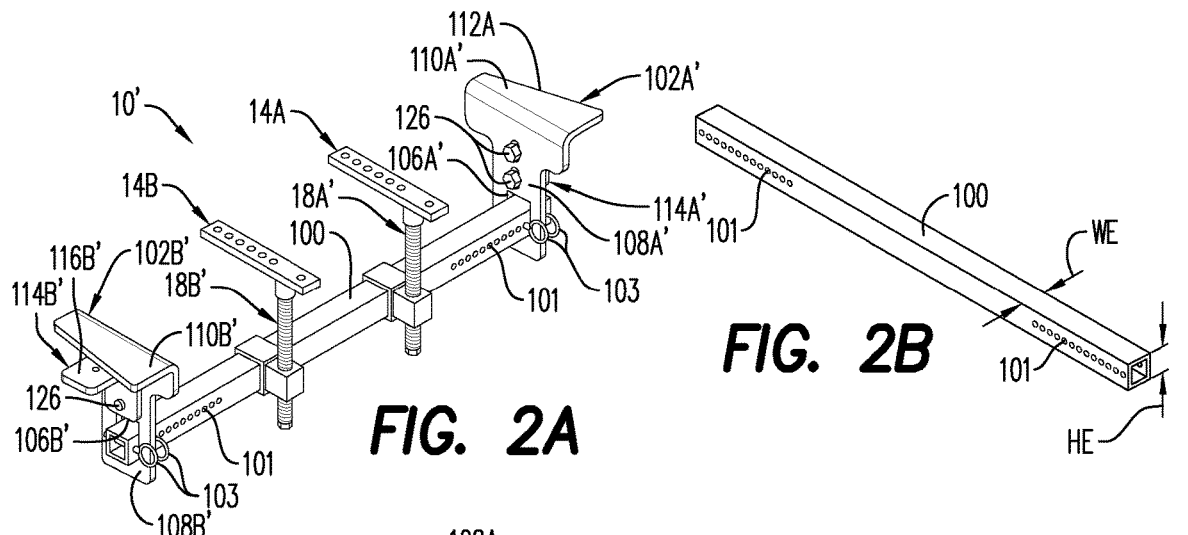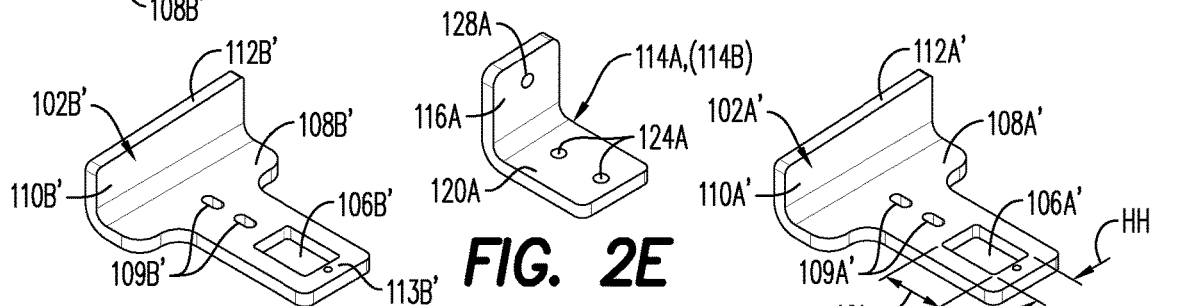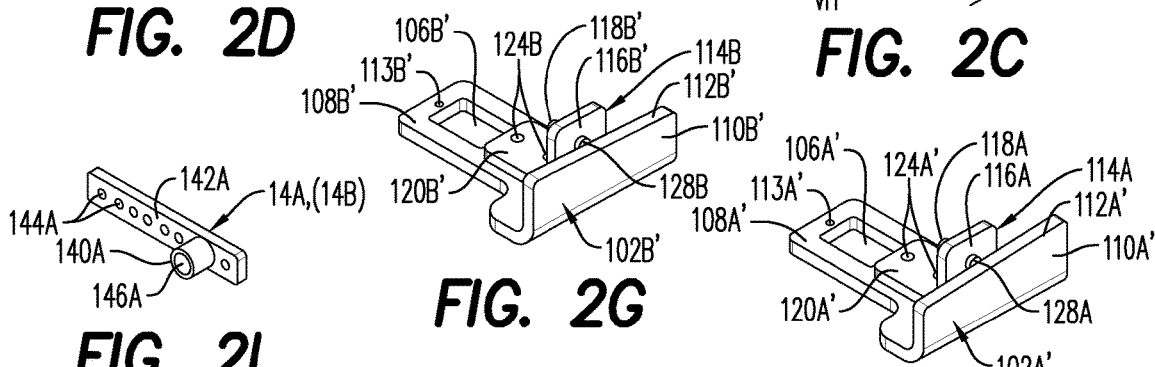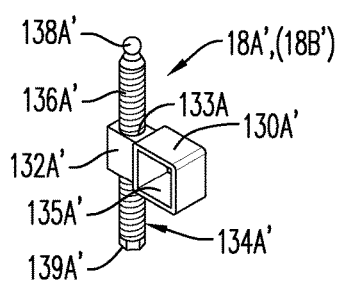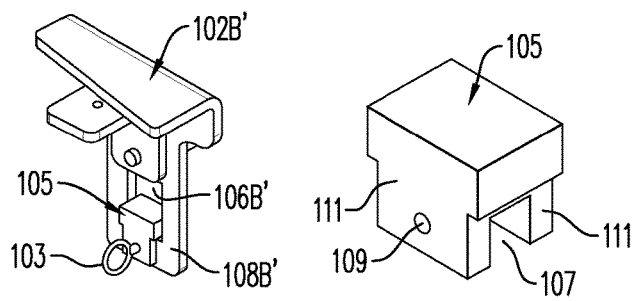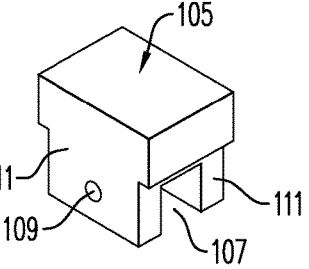

ENGINE SUPPORT SYSTEM AND METHOD

FIELD OF THE DISCLOSURE

The disclosure relates generally to engine supports. In particular aspects, the disclosure relates to a frame mounted engine support system and method including a frame mounted engine support and at least one engine mounted coupler.

BACKGROUND

Vehicle engines, such as for trucking vehicles, occasionally require servicing and/or tuning to repair, maintain, or improve engine performance. Operators may require access to different portions of the engine depending on the type of work to be performed. Accordingly, operators may need a mechanical device to support and/or elevate the engine relative to a frame of a vehicle to provide sufficient access to the desired portion of the engine.

SUMMARY

According to an aspect of the disclosure, an engine support system for a vehicle comprises a frame mount comprising an elongated body, a first arm slidably mounted on the elongated body and configured to releasably engage a first side of a frame of a vehicle, and a second arm mounted on the elongated body and configured to releasably engage a second side of the vehicle frame. The engine support system further comprises a first coupler configured to attach to an engine of the vehicle. The engine support system further comprises a first jack assembly, comprising a first collar slidably mounted on the elongated body and configured to move in a longitudinal direction of the elongated body, and a first jack rod coupled to the first collar and configured to move generally perpendicular to the longitudinal direction of the elongated body, the first jack rod comprising a body and a ball mount at an end of the body, the ball mount configured to insert into the first coupler at an underside of an engine block of the vehicle.

In some examples of the engine support system the first coupler is configured to removably attach to the underside of the engine block of the vehicle.

In some examples of the engine support system the first coupler is configured to removably attach to threaded holes configured to mount an oil drip pan to the underside of the engine block of the vehicle.

In some examples of the engine support system the first coupler includes a receptacle defining a through hole configured to receive a fastener to removably attach the first coupler to a single threaded hole at the underside of the engine block of the vehicle.

In some examples of the engine support system the first coupler includes a receptacle fixedly attached to a plate with a plurality of through holes, at least two of the plurality of through holes configured to align with at least two threaded holes at the underside of the engine block of the vehicle.

In some examples of the engine support system the first arm comprises an opening having a non-circular cross-section, the elongated body having a corresponding non-circular cross-section and being received in and non-rotatable relative to the opening.

In some examples of the engine support system the first arm comprises an opening through which the elongated body is adapted to slide.

In some examples of the engine support system the opening has a vertical height in a longitudinal direction of the first arm that is greater than a vertical height of the elongated body.

In some examples of the engine support system a spacer is attachable to the first arm at a bottom of the opening.

In some examples of the engine support system the elongated body has a non-circular cross-section and the first collar has non-circular opening, the elongated body being received in and non-rotatable relative to the first collar.

In some examples of the engine support system the first arm comprises a first flange configured to engage a first upper surface of a first rail of the vehicle frame and the second arm comprises a second flange configured to engage a second upper surface of a second rail of the vehicle frame.

In some examples of the engine support system the first coupler a first edge of the first flange of the first arm is tapered to increase a contact surface area with the first rail angled relative to a center axis of the vehicle, and a second edge of the second flange of the second arm is tapered to increase a contact surface area with the second rail angled relative to the center axis of the vehicle.

In some examples of the engine support system the frame mount further comprises a first clamping jaw removably attached to the first arm, the first clamping jaw comprising a first bracket and a first clamping bolt, the first bracket defining a first threaded hole, the first clamping bolt positioned in the first threaded hole and configured to move relative thereto to clamp a portion of the first rail between the first flange and the first clamping bolt, and a second clamping jaw removably attached to the second arm, the second clamping jaw comprising a second bracket and a second clamping bolt, the second bracket defining a second threaded hole, the second clamping bolt positioned in the second threaded hole and configured to move relative thereto to clamp a portion of the second rail between the second flange and the second clamping bolt.

In some examples of the engine support system the first jack assembly is configured to lift the engine block of the vehicle relative to the vehicle frame by vertical movement of the jack rod relative to the frame mount engaged with the vehicle frame with the ball mount in the first coupler.

In some examples of the engine support system the body of the first jack rod is threaded.

In some examples of the engine support system the first jack assembly further comprises a first threaded cuff attached to the first collar, the first jack rod positioned within the threaded cuff.

In some examples of the engine support system the first jack assembly further comprises a first threaded cuff fixedly attached to an outer surface of the first collar and offset from a center of the first collar along a center axis of the first collar.

In some examples of the engine support system the first collar is C- or U-shaped.

In some examples of the engine support system the second arm is slidably mounted on the elongated body.

In some examples of the engine support system the second arm comprises an opening having a non-circular cross-section, the elongated body having a corresponding non-circular cross-section and being received in and non-rotatable relative to the opening.

In some examples of the engine support system the first coupler the first jack assembly is configured to engage the first coupler at a first side of the engine block of the vehicle, and the engine support system further comprises a second jack assembly configured to engage a second coupler at a second side of the engine block of the vehicle comprising a second collar slidably mounted on the elongated body and configured to move in a longitudinal direction of the elongated body, and a second jack rod threadably coupled to the second collar and configured to move generally perpendicular to the longitudinal direction of the elongated body, the second jack rod comprising a second body and a second ball mount at an end of the second body, the second ball mount configured to insert into the second coupler at the underside of the engine block of the vehicle.

In some examples of the engine support system the first arm, the second arm, and the first collar are removably mounted on the elongated body.

According to another aspect of the disclosure, a method of supporting an engine of a vehicle comprises suspending a frame mount of an engine support system across a frame of a vehicle beneath an engine block of the vehicle by moving a first arm slidably attached to an elongated body relative to a second arm attached to the elongated body to an engaged orientation, sliding a first collar of a first jack assembly of the engine support system in a longitudinal direction of the elongated body to align a ball mount of a first jack rod of the first jack assembly with a first coupler at an underside of the engine block of the vehicle, and supporting an engine of the vehicle relative to the vehicle frame by moving the first jack rod of the first jack assembly generally perpendicular to the longitudinal direction of the elongated body to insert the ball mount of the first jack rod of the first jack assembly into the first coupler at the underside of the engine block.

In some examples, the method further comprises lifting an engine of the vehicle relative to the vehicle frame by continued movement of the first jack rod of the first jack assembly.

In some examples, the method further comprises attaching the first coupler to the underside of the engine block of the vehicle.

In some examples, the method further comprises attaching a first clamping jaw to the first arm to position a portion of a first rail of the vehicle frame between a flange of the first arm and a first bracket of the first clamping jaw, and rotating a first clamping bolt in a first threaded hole of the first bracket of the first clamping jaw to clamp the portion of the first rail of the vehicle frame between the first flange and the first clamping bolt.

In some examples, the method further comprises sliding a second collar of a second jack assembly of the engine support system in the longitudinal direction of the elongated body to align a ball mount of a second jack rod of the second jack assembly with a second coupler at the underside of the engine block of the vehicle, and supporting the engine of the vehicle relative to the vehicle frame by vertically moving the second jack rod of the second jack assembly to insert the ball mount of the second jack rod of the second jack assembly into the second coupler at the underside of the engine block.

In some examples, suspending the frame mount of the engine support system across the frame of the vehicle beneath the engine block of the vehicle according to the method further comprises moving the second arm relative to the elongated body to an engaged orientation.

In some examples, the method further comprises sliding the elongated body relative to the first arm by moving the elongated body through an opening in the first arm.

In some examples, the opening has a vertical height in a longitudinal direction of the first arm that is greater than a vertical height of the elongated body and the method further comprises supporting the elongated body on a bottom of the opening.

In some examples, the method further comprises changing a vertical height of the opening by attaching a spacer to the first arm at a bottom of the opening, the elongated body being supported on the bottom of the opening on top of the spacer.

Additional features and advantages will be set forth in the detailed description which follows, and in part will be readily apparent from that description to those skilled in the art or recognized by practicing the embodiments as described herein, including the detailed description which follows, the claims, as well as the appended drawings.

It is to be understood that both the foregoing general description and the following detailed description are merely exemplary, and are intended to provide an overview or framework for understanding the nature and character of the claims. The accompanying drawings are included to provide a further understanding, and are incorporated in and constitute a part of this specification. The drawings illustrate one or more embodiment s), and together with the description serve to explain principles and operation of the various embodiments.

BRIEF DESCRIPTION OF THE DRAWINGS

The accompanying drawing figures incorporated in and forming a part of this specification illustrate several aspects of the disclosure, and together with the description serve to explain the principles of the disclosure.

FIG. 2A is a perspective view of an engine support system according to another aspect of the present invention.

FIG. 2B is a perspective view of an elongated member of the engine support system of FIG. 2A.

FIG. 2C is a perspective view of a first arm of the engine support system according to FIG. 2A.

FIG. 2D is a perspective view of a second arm of the engine support system according to FIG. 2A.

FIG. 2E is a perspective view of a clamping jaw of the engine support system according to FIG. 2A.

FIG. 2F is a perspective view of a first arm attached to a clamping jaw of the engine support system according to FIG. 2A.

FIG. 2G is a perspective view of a second arm attached to a clamping jaw of the engine support system according to FIG. 2A.

FIG. 2H is a perspective view of a jack assembly of the engine support system according to FIG. 2A.

FIG. 2I is a perspective view of a coupler for the engine support system according to FIG. 2A.

FIG. 2J is a perspective view of a spacer for the engine support system according to FIG. 2A.

FIG. 2K is a perspective view of a spacer attached to a first arm of the engine support system according to FIG. 2A.

DETAILED DESCRIPTION

Figure 1A:
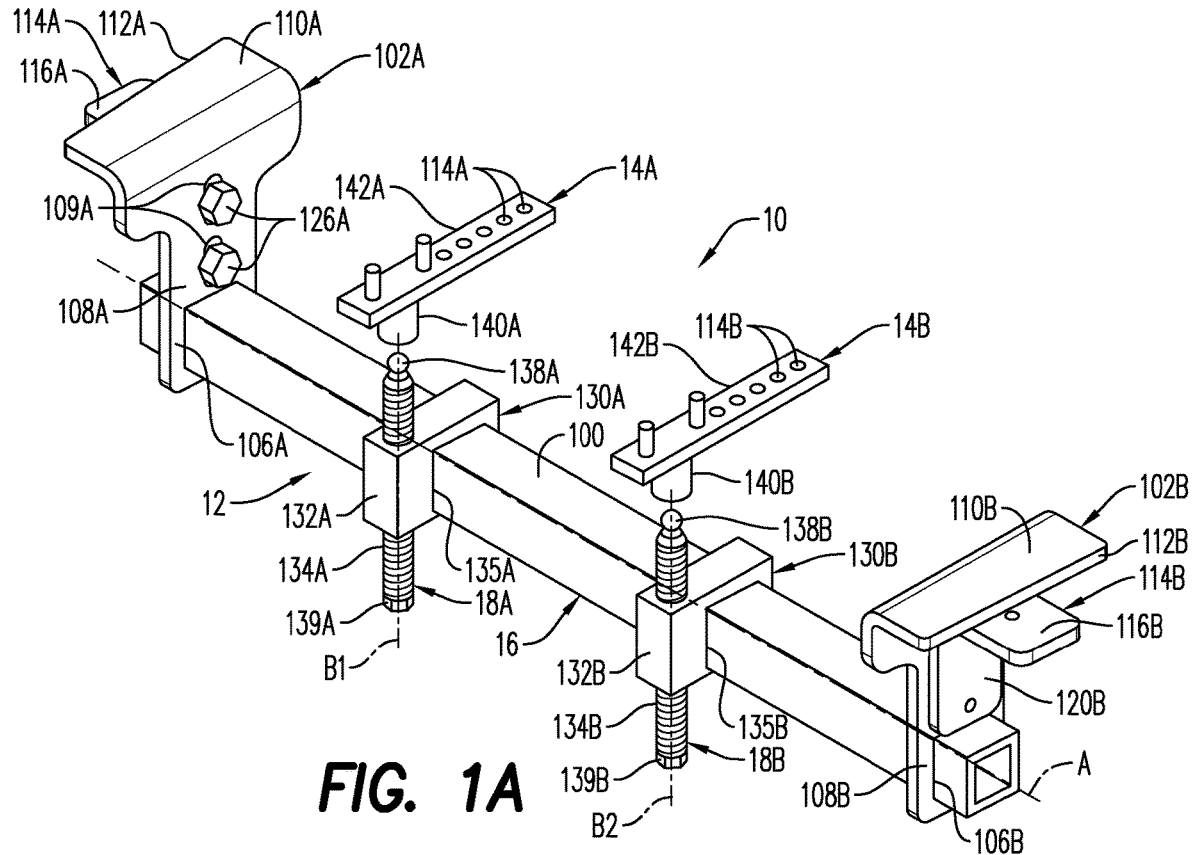
FIG. 1A is a perspective view of an engine support system according to an aspect of the present invention.

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Relative terms such as "below" or "above" or "upper" or "lower" or "horizontal" or "vertical" may be used herein to describe a relationship of one element, layer, or region to another element, layer, or region as illustrated in the Figures. It will be understood that these terms and those discussed above are intended to encompass different orientations of the device in addition to the orientation depicted in the Figures.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Figure 1B:
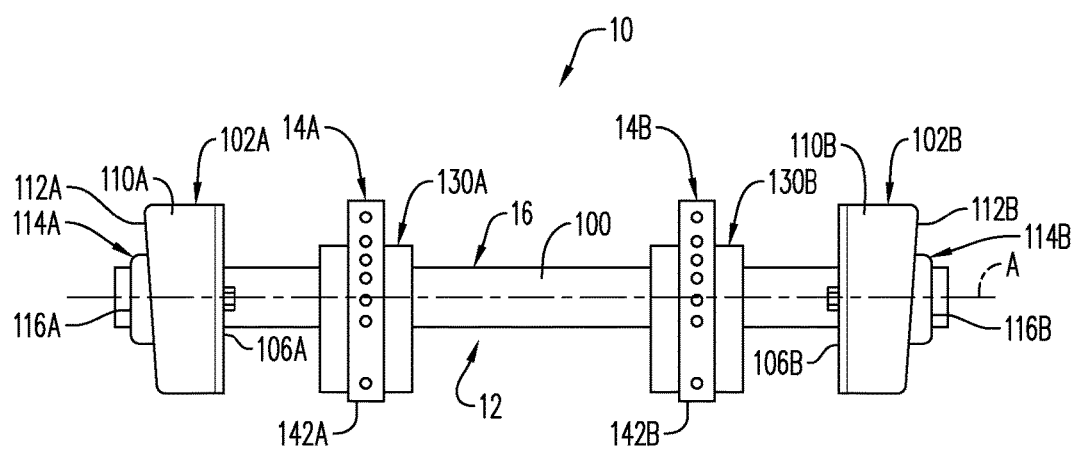
FIG. 1B is a top view of the engine support system of FIG. 1A.
Figure 1C:
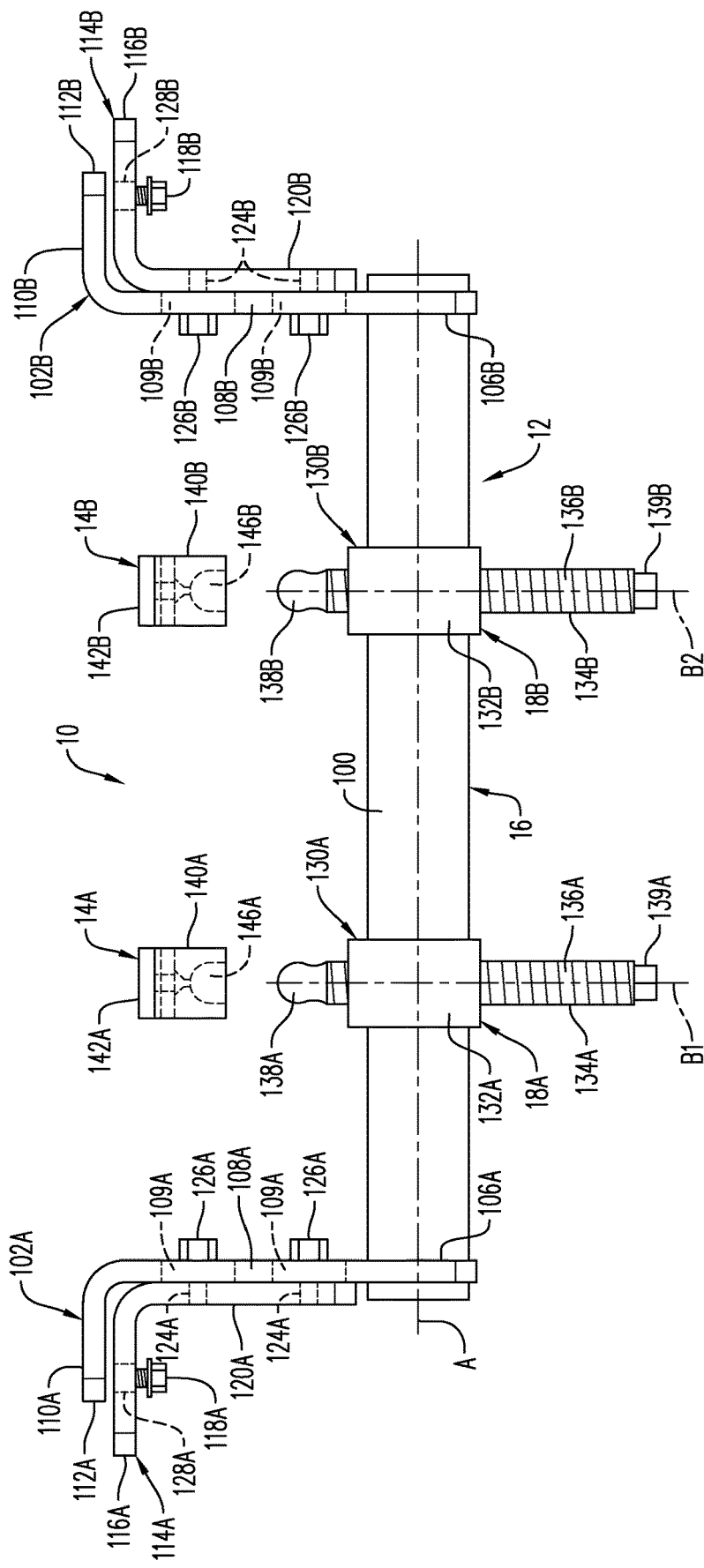
FIG. 1C is a side view of the engine support system of FIG. 1A.

FIGS. 1A-1C are views of an engine support system 10. The engine support system 10 includes an engine support 12 and two couplers 14A, 14B. The engine support 12 includes a frame mount 16, a first jack assembly 18A movably attached to the frame mount 16, and a second jack assembly 18B movably attached to the frame mount 16. The frame mount 16 includes an elongated body 100, a first arm 102A slidably mounted on the elongated body, generally proximate a first end of the elongated body 100, and a second arm 102B slidably mounted on the elongated body, generally proximate a second end of the elongated body 100 opposite the first end.

The first arm 102A and the second arm 102B each includes an opening 106A and 106B, respectively, in which the elongated body 100 is received and is adapted to slide. The openings 106A and 106B may have a common axis A with the elongated body as seen in FIGS. 1A-1C. In some examples, the elongated body 100 only includes one slidable arm, e.g., arm 102A, while the other arm, e.g., 102B, is fixed to the elongated body.

In some examples, the external shape of the elongated body 100 and the internal shape of the openings 106A and 106B have corresponding non-circular shapes (e.g., rectangular cross-section, square cross-section, etc.) to prevent relative rotation between the elongated body 100 and the first arm 102A and the second arm 102B. Such a configuration ensures vertical alignment of the first arm 102A, second arm 102B, first jack assembly 18A, and/or second jack assembly 18B. This relative alignment facilitates ease of use by an operator in mounting to the vehicle frame and engaging couplers 14A, 14B mounted to the underside of an engine block of the engine. The elongated body 100 and first and second arms 102A and 102B are ordinarily but not necessarily non-rotatable relative to each other. The external shape of the elongated body and the internal shapes of the first and second arms may, however, be circular and rotatable relative to each other.

The first arm 102A is configured to releasably engage a first side (e.g., first rail) of a vehicle frame of the vehicle. The first arm 102A includes a first vertical portion 108A extending upward from the opening 106A defining one or more slots 109A. The first arm 102A further includes a first flange 110A outwardly extending from a top of the first vertical portion 108A. The first flange 110A is configured to engage the first rail of the vehicle frame. The first flange 110A includes a first edge 112A, which is ordinarily tapered (e.g., from a front to a back) to provide a maximum contact surface area when the first rail is angled relative to a center axis of the vehicle.

In some examples, a first clamping jaw 114A is removably attached to the first arm 102A. The first clamping jaw 114A applies a compressive force on the first rail. The first clamping jaw 114A includes a first bracket 116A and a first clamping bolt 118A (FIG. 1C). In particular, the first clamping jaw 114A includes the first bracket 116A, which is ordinarily horizontal, and a vertical portion 120A (FIG. 1C). The vertical portion 120A includes one or more threaded holes 124A (shown by dashed lines in FIG. 1C) to receive fasteners 126A inserted through the slots 109A of the first arm 102A to attach the first clamping jaw 114A to the first arm 102A. The slots 109A of the first arm 102A allow for adjustment of vertical position of the first clamping jaw 114A relative to the first arm 102A to accommodate frame rails having flanges of varying thicknesses. The first bracket 116A includes a threaded hole 128A (FIG. 1C) to receive the first clamping bolt 118A (FIG. 1C) therein. The first clamping bolt 118A is configured to move relative to the first bracket 116A to clamp a portion of the first rail between the first flange 110A and the first clamping bolt 118A.

It is noted that "horizontal" (or "lateral") and "vertical" in this context generally refers to a directional orientation relative to a vehicle or vehicle frame. In particular, "horizontal" (or "lateral") and "vertical" may refer to a directional orientation of the engine support system 10 and/or components thereof (e.g., engine support 12, couplers 14A, 14B, etc.) when applied or being applied to the vehicle frame. For example, "horizontal" (or "lateral") may refer to an orientation side to side and/or front to back relative to a vehicle (e.g., vehicle frame), and "vertical" may refer to an orientation top to bottom relative to a vehicle (e.g., vehicle frame).

The second arm 102B at the second end of the elongated body 100 is configured to releasably engage a second side (e.g., second rail) of the vehicle frame of the vehicle. In some examples, a second clamping jaw 114B is removably attached to the second arm 102B. The second arm 102B and the second clamping jaw 114B can include similar features as the first arm 102A and the first clamping jaw 114A and, for purposes of the present discussion, are accordingly similarly numbered.

The first jack assembly 18A includes a first collar 130A, a first threaded hole or cuff 132A, and a first jack rod 134A. The first collar 130A is slidably coupled to and positioned over the elongated body 100 and movable (e.g., laterally, horizontally, side to side, etc.) relative thereto along axis A through an opening 135A of the first collar. The opening 135A of the first collar 130A ordinarily but not necessarily includes a non-circular cross-section (e.g., rectangular cross-section, square cross-section, etc.) corresponding to an external shape of the elongated body 100 to prevent relative rotation between the first collar and the elongated body, however, the opening may be configured to permit rotation between the first collar and the elongated body. If the opening 135A of the first collar 130A and the elongated member 100 are non-rotatable relative to each other, this can facilitate ensuring vertical alignment of the first jack assembly 18A. The opening 135A of the first collar 130A can be U- or C-shaped, i.e. open at one end, as shown in FIGS. 1A-1C to extend around a horizontal top side and two vertical sides of the elongated body 100. In other aspects of the invention, the openings in the collars completely surround the elongated body.

The first threaded cuff 132A may be in the form of a threaded hole in a leg of the first collar 130A as shown in FIGS. 1A-1C. The axis B1 of the first threaded cuff 132A is generally perpendicular to the axis A of the first collar 130A. Ordinarily, the axis B1 of the first threaded cuff 132A is perpendicular to the axis A of the first collar 130A, however, it will be appreciated that it may be desirable to alter the angle of the first threaded cuff 132A from perpendicular for certain applications.

With reference to the embodiment of FIGS. 1A-1C, the first jack rod 134A is positioned within the first threaded cuff 132A and vertically movable (e.g., translatable) relative thereto. In this way, the first jack rod 134A is coupled to the first collar 130A and configured to move vertically relative to the first collar 130A. The first jack rod 134A includes a threaded body 136A, a ball mount 138A at a top end of the threaded body 136A, and a hex cap 139A at a bottom end of the threaded body 136A. The hex cap 139A is configured to provide a feature for a tool to engage the first jack rod 134A to rotate the first jack rod 134A. Accordingly, rotation of the first jack rod 134A rotates and vertically translates the first jack rod 134A relative to the first threaded cuff 132A and the first collar 130A. The first jack assembly 18A is configured to engage the first coupler 14A at a first side of the engine block of the vehicle, such as by insertion of the ball mount 138A into the first coupler 14A at an underside of the engine block of the vehicle. The first jack assembly 18A is configured to engage the first coupler 14A to support and/or lift the engine of the vehicle.

The second jack assembly 18B includes a second collar 130B, a second threaded cuff 132B, and a second jack rod 134B. The second jack assembly 18B includes similar features as the first jack assembly 18A and is accordingly similarly numbered. The second collar 130B is configured to move (e.g., translate) along axis A of the elongated body 100 (e.g., independent of the first collar 130A).

The axis B2 of the second threaded cuff 132B is generally perpendicular to the axis A of the second collar 130B again in the sense that it is ordinarily perpendicular, though there may be circumstances where it may be desirable to deviate from perpendicular. The second jack assembly 18B is configured to engage the second coupler 14 at a second side of the engine block of the vehicle, such as by insertion of the ball mount 138B into the second coupler 14B at an underside of the engine block of the vehicle. The second jack assembly 18B is configured to engage the second coupler 14B to support and/or lift the engine of the vehicle.

The first coupler 14A is configured to removably attach to the underside of the engine block of the vehicle. In some examples, the first coupler 14A includes a receptacle 140A fixedly attached to a plate 142A with a plurality of through holes 144A defined in the plate 142A. The plurality of through holes 144A are configured to accommodate different types of engine blocks which may have differently spaced holes. In other words, at least two of the plurality of through holes 144A of the plate 142A are configured to align with at least two threaded holes at the underside of the engine block of the vehicle. The receptacle 140A includes an opening 146A (shown by dashed lines in FIG. 1C) configured to receive the ball mount 138A of the first jack rod 134A.

The second coupler 14B includes similar features as the first coupler 14A and is accordingly similarly numbered.

It is noted that the components of the engine support system 10 could be made of steel and fastened together using any of a variety of attachments (e.g., bolts, welding, etc.).

FIG. 2A shows an engine support system 10' with several features that differ from the engine support system shown in FIG. 1A. The elongated body 100 may be the same elongated body as in FIG. 1A. The elongated body 100 shown in FIG. 2A (and 2B) includes a series of pin holes 101 at ends of the elongated body to receive pins 103 for retaining the arms 102A' and 102B' in desired longitudinal positions along the elongated body. A suitable form of pin 103 has a ring at one end or is otherwise enlarged at one end to prevent the pin from passing entirely through the pin holes 101, and a hole (not shown) at an opposite end for receiving a cotter pin (not shown) to hold the pin in place in the pin hole. Pin holes and pins may also be provided in connection with the elongated body 100 of FIG. 1A.

In the engine support system 10' of FIG. 2A, the openings 106A' and 106B' in the first and second arms 102A' and 102B', respectively, are rectangular with a vertical height in a longitudinal direction of the arms that is greater than a vertical height of the elongated body so that the axis of the elongated body 100 is parallel with but not necessarily common with the axis of the openings 106A' and 106B'. For example, if the elongated body 100 is square with a width WE and a height HE equal to the width as shown, for example, in FIG. 2B, the opening 106A' in the first arm 102A' (FIGS. 2C and 2F) and the opening 106B' in the second arm 102B' (FIGS. 2D and 2G) may be rectangular as shown in FIGS. 2C, 2D, and 2F having a horizontal width HH (shown in FIG. 2C) sufficiently larger than the width WE of the elongated body to permit sliding of the elongated body through the opening, and having a vertical height VH (shown in FIG. 2C) larger than the horizontal width of the opening and larger than the vertical height HE of the elongated body so that the elongated body can be moved vertically up and down in the opening. By providing openings 106A' and 106B' that are longer in the vertical direction than the height HE of the elongated member 100, the position of the elongated member relative to the arms 102A' and 102B' can be adjusted in height, such as by providing a spacer 105 (FIG. 2J) at a bottom of an opening, as shown for the arm 102B' in FIG. 2K, upon which the elongated member can rest. The elongated member 100 need not be rectangular or square in cross-section, and may be wider than taller, or taller than wider, and the openings 106A' and 106B' need not be rectangular or square in cross-section, and may be wider than taller, or taller than wider, however, it may nonetheless be desirable to provide a configuration wherein the openings 106A' and 106B' are vertically longer than the elongated member 100 is in its vertical direction, whatever the shape of the openings and the elongated member, as such a configuration can facilitate avoiding interference with components such as suspension components on the vehicle that otherwise might be contacted by the elongated member 100. In different models of certain vehicles, for example, the angle at which the engine is mounted relative to the crankshaft may result in the bottom of the engine lying closer to suspension components than in other models, necessitating raising of the elongated member to avoid interference with the suspension components.

The first and second arms 102A' and 102B' can otherwise be substantially the same as the first and second arms 102A and 102B described in connection with FIGS. 1A-1C. As seen in FIGS. 2C and 2D, the openings 106A' and 106B' of the first arm 102A' and the second arm 102B' are provided in a first vertical portion 108A' and a second vertical portion 108B' of the first arm and the second arm, respectively. Slots 109A' and 109B' are provided in the first vertical portion 108A' and the second vertical portion 108B', respectively, for attaching vertical portions 120A and 120B of clamping jaws 114A (FIG. 2F) and 114B (FIG. 2G). The clamping jaws 114A and 114B can be identical, and, as seen in FIG. 2E, can include holes 124A (and identical holes 124B in the clamping jaw 114B as seen in FIG. 2G) for securing the vertical portions 120A and 120B of the clamping jaws to the first and second vertical portions 108A' and 108B' of their respective arms by suitable fasteners such as bolts and nuts, or fasteners 126 that can mate with internal threads in the holes 124A. Instead of providing threaded holes 124A, the holes can be unthreaded and the clamping jaws may be attached to the arms by bolts that extend through the slots in the arms and into the unthreaded holes and that mate with bolts.

The first arm 102A' and the second arm 102B' can also include a first flange 110A' and a second flange 110B' extending outwardly, generally perpendicularly, from the tops of the first vertical portion 108A' and the second vertical portion 108B', respectively. The first flange 110A' and the second flange 110B' are configured to engage the first and second rails of the vehicle frame. The first flange 110A' includes a first edge 112A' and the second flange 110B' includes a second edge 112B'. As seen, for example, in FIG. 2A, the first edge 112A' and the second edge 112B' are ordinarily tapered (e.g., from a front to a back) to provide a maximum contact surface area with the first and second rails, which are often angled relative to a center axis of the vehicle.

The slots 109A' of the first arm 102A' and the slots 109B' of the second arm 102B' are ordinarily elongated to allow for adjustment of vertical position of the first clamping jaw 114A' relative to the first arm 102A' and the second clamping jaw 114B relative to the second arm 102B' to accommodate frame rails having flanges of varying thicknesses.

As seen in FIGS. 2F and 2G, the first clamping jaw 114A and the second clamping jaw 114B include a first bracket 116A and a second bracket 116B, respectively, which are ordinarily horizontal in the engine support system 10' as shown in FIG. 2A, and the first vertical portion 120A and the second vertical portion, respectively. As seen in FIG. 2E with reference to the first clamping jaw 114A (which is ordinarily identical to the second clamping jaw 114B), the vertical portion 120A includes the one or more holes 124A to receive fasteners for attaching the first clamping jaw to the first arm. As seen with reference to FIGS. 2F and 2G, the first bracket 116A and the second bracket 116B each includes a threaded hole 128A and 128B, respectively, to receive a first clamping bolt 118A and a second clamping bolt 118B, respectively, therein. The first clamping bolt 118A and the second clamping bolt 118B are configured to move relative to the first bracket 116A and the second bracket 116B, respectively, so that a portion of the first rail is clamped between the first flange 110A and the first clamping bolt 118A and a portion of the second rail is clamped between the second flange 110B and the second clamping bolt 118B.

FIG. 2A shows the engine support system 10' with identical first and second jack assemblies 18A' and 18B'. For purposes of discussion, the first jack assembly 18A' shown in FIG. 2H shall be discussed, it being appreciated that the discussion applies equally to the second jack assembly 18B'. The jack assembly 18A' includes a first collar 130A', a first cuff 132A' with a threaded hole 133A', and a first jack rod 134A'. The first collar 130A' is slidably coupled to and positioned around the elongated body 100, which extends through an opening 135A' in the first collar. The first collar 130A' is movable in the direction of the longitudinal axis of the elongated body. The opening 135A' of the first collar 130A' ordinarily but not necessarily includes a non-circular cross-section (e.g., rectangular cross-section, square cross-section, etc.) corresponding to an external shape of the elongated body 100 to prevent relative rotation between the first collar and the elongated body, however, the opening may be configured to permit rotation between the first collar and the elongated body. If the opening 135A' of the first collar 130A' and the elongated member 100 are non-rotatable relative to each other, this can facilitate ensuring vertical alignment of the jack assembly 18A.

The first threaded cuff 132A' may be attached to or integral with an outer side surface of a portion of the first collar 130A'. The axis of the threaded hole 133A' is generally perpendicular to the central axis of the hole 135A' of the first collar 130A'. Ordinarily, the axis of the threaded hole 133A' is perpendicular to the central axis of the first collar, however, it will be appreciated that it may be desirable to alter the angle of the threaded hole from perpendicular for certain applications.

While the first threaded cuff 132A' and its threaded hole 133A' are shown as centered along an axis of the opening 135' of the first collar 130A' in FIGS. 2A and 2H, as seen with reference to FIGS. 3A-3E, a first threaded cuff 132A" and its threaded hole may be offset from a center of the first collar 130A" along the axis of the opening of the first collar. Similarly, while the threaded hole of the first threaded cuff 132A of FIGS. 1A-1C is ordinarily formed at or close to a center of the width of the first collar 130A along the axis A of the opening 135A of the first collar, the threaded hole of the first threaded cuff may be offset from the center of the first collar along the axis A. Offsetting the location of the cuff and the threaded hole may provide more variability for mounting to the elongated body 100 and for accommodating different types of engines and/or vehicles.

As seen in FIG. 2H, the first jack rod 134A' is positioned within the threaded hole 133A' of the first threaded cuff 132A' and vertically movable (e.g., translatable) relative thereto. In this way, the first jack rod 134A' is coupled to the first collar 130A' and configured to move vertically relative to the first collar 130A'. Like the first jack rod 134A of FIGS. 1A-1C, the first jack rod 134A' of FIG. 2H ordinarily includes a threaded body 136A', a ball mount 138A' at a top end of the threaded body 136A', and a hex cap 139A' at a bottom end of the threaded body 136A'. The hex cap 139A' is configured to provide a feature for a tool to engage the first jack rod 134A' to rotate the first jack rod. Accordingly, rotation of the first jack rod 134A' vertically translates the first jack rod relative to the first threaded cuff 132A' and the first collar 130A'.

The first jack assembly 18A' is configured to engage a first coupler 14A' (FIG. 2I) at a first side of the engine block of the vehicle, such as by insertion of the ball mount 138A' into the first coupler 14A' at an underside of the engine block of the vehicle. The first jack assembly 18A is configured to engage the first coupler 14A to support and/or lift the engine of the vehicle.

The first coupler 14A of FIGS. 2A and 2I is ordinarily identical to the second coupler 14B of FIG. 2A, and is the same as the first and second couplers of FIGS. 1A-1C. The first coupler 14 is configured to removably attach to the underside of the engine block of the vehicle. In some examples, the first coupler 14A includes a receptacle 140A fixedly attached to a plate 142A with a plurality of through holes 144A in the plate 142A. The plurality of through holes 144A are configured so that some of the holes 144A can align with threaded holes that are provided on different types of engine blocks. The threaded holes on the engine blocks may be provided for attaching components of a vehicle to the engine, or specially provided for purposes of attaching a coupler of an engine support system according to the present invention. Ordinarily, at least two of the plurality of through holes 144A of the plate 142A are configured to align with at least two threaded holes at the underside of an engine block of a given vehicle. The receptacle 140A includes an opening 146A configured to receive the ball mount 138A of the first jack rod 134A. The second coupler 14B includes similar features as the first coupler 14A.

The spacer 105 such as is shown in FIG. 2J can be attached at the bottoms of the openings 106A' and 106B' of the arms 102A' and 102B', respectively, so that the elongated member 100 will rest on spacers instead of the bottoms of the openings. Such an arrangement can be useful for, among other things, avoiding interference between the elongated member 100 and structures on a vehicle such as suspension components. FIG. 2K shows a form of spacer 105 attached at the bottom of the opening 106B' of an arm 102B' (the same arrangement applies for spacers at the bottom of openings 106A' of arms 102A'). This spacer 105 includes a notch 107 for receiving an edge of the arm 102B' at the bottom of the opening 106B'. The spacer 105 further includes holes 109 in legs 111 of the spacer defining the notch. When the spacer 105 is seated on the edge of the arm 102B' at the bottom of the opening 106B', the holes 109 in the legs 111 of the spacer align with a hole 113B' (FIG. 2G) in the vertical portion 108B' of the arm. The spacer 105 can be secured to the arm 102B' such as by a pin 103 that is received in the holes 109 in the legs 111 of the spacer and the hole 113B' in the vertical portion 108B' of the arm and locked in place with a cotter pin.

Figure 3A:
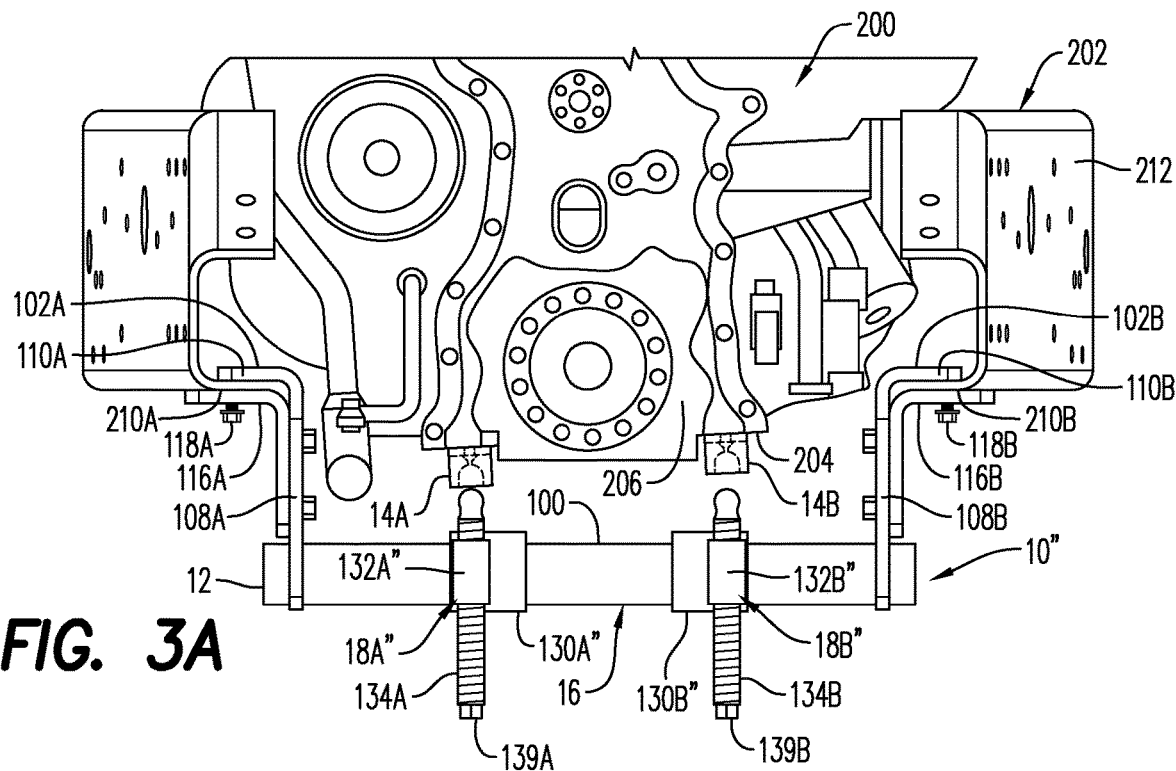
FIG. 3A is a side view of an engine support system according to another aspect of the present invention and illustrating jack rods of jack assemblies of the engine support system aligned with and disengaged from couplers mounted to the engine.
Figure 3B:
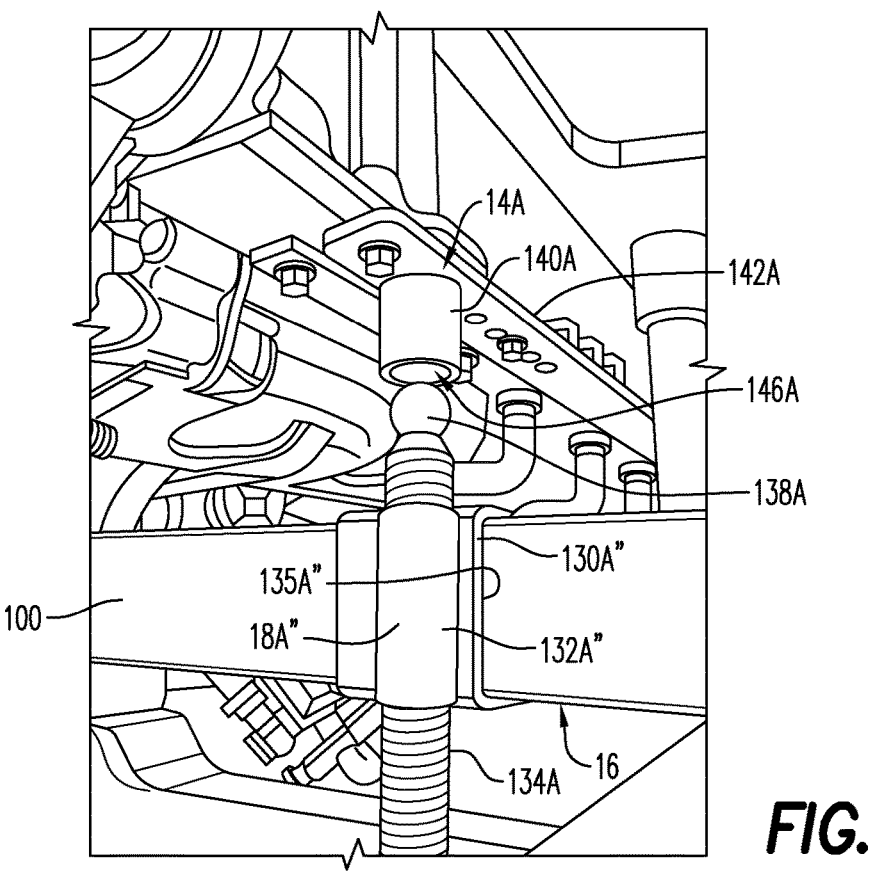
FIG. 3B is a perspective view of the engine support system of FIG. 3A illustrating one of the jack rods aligned with and disengaged from one of the couplers.

FIGS. 3A-3E show an engine support system 10" that is the same as the engine support system 10 of FIGS. 1A-1C except for jack assemblies 18A" and 18B" with a first collar 130A" and a second collar 130B", respectively, that differs from the first collar 130A and the second collar 130B of the jack assemblies 18A and 18B of the engine support system of FIGS. 1A-1C in that, like the collars of the jack assemblies 18A' and 18B' of FIG. 2A, the first collar 130A" and the second collar 130B" completely surround the elongated body 100, whereas the first collar 130A and the second collar 130B are C- or U-shaped, i.e. open on one side. The description of components of the engine support systems 10 and 10" are otherwise the same, except where otherwise indicated. FIGS. 3A-3E are views illustrating use of an engine support system 10" like that of FIGS. 1A-1C to support and/or lift an engine 200 of the vehicle 202. FIG. 2A is a side view of the engine support system 10" illustrating jack rods 134A, 134B of jack assemblies 18A", 18B" of the engine support system 10" aligned with and disengaged from the couplers 14A, 14B mounted to the engine 200. It will be appreciated that the description of the use of the engine support system 10" in FIGS. 3A-3E applies as well to the engine support system 10 of FIGS. 1A-1C. In the illustrated method, the engine support system 10" (or 10) can be used by removing the oil drip pan from the underside 204 of the engine block 206. Referring to FIGS. 3A and 3B, the couplers 14A, 14B are then mounted to the threaded holes 208 (see e.g., FIG. 3C) at the underside 204 of the engine block 206 that were used for attachment of the oil drip pan.

Referring to FIG. 3A, the first arm 102A is moved along elongated body 100 so that the first flange 110A rests on the first rail 210A of a vehicle frame 212 of the vehicle 202, and the second flange 110B rests on the second rail 210B of the vehicle frame 212 of the vehicle 202 with the elongated body 100 positioned beneath the engine 200. If the second arm 102B is movable relative to the elongated body 100, the second arm may also be moved along the elongated by so that the second flange 110B rests on the second rail 210B of the vehicle frame 212 of the vehicle 202. Further, the frame mount 16 is positioned along a length of the vehicle 202 so that the horizontal path of the jack rods 134A, 134B is aligned with the couplers 14A, 14B along the length of the vehicle 202.

To secure the frame mount 16 along the length of the vehicle 202, the first bracket 116A is mounted to the first vertical portion 108A of the first arm 102A and moved vertically toward the first rail 210A. The first clamping bolt 118A is then moved vertically to apply or increase the clamping pressure applied to the first rail 210A (i.e., between the first flange 110A and the first clamping bolt 118A). Similarly, the second bracket 116B is mounted to the second vertical portion 108B of the second arm 102B and moved vertically toward the second rail 210B. The second clamping bolt 118B is then moved vertically to apply or increase the clamping pressure applied to the second rail 210B (i.e., between the second flange 110B and the second clamping bolt 118B).

Referring to FIGS. 3A and 3B, once the frame mount 16 is secured along a length of the vehicle 202, the first collar 130A" of the first jack assembly 18A" is slid horizontally along the elongated body 100 to align the first jack rod 134A with the first opening 146A of the first receptacle 140A of the first coupler 14A. Further, the second collar 130B" of the second jack assembly 18B" is slid horizontally along the elongated body 100 to align the second jack rod 134B" with the second opening 146B of the second receptacle 140B of the second coupler 14B. It is noted that the offset of the jack rods 134A, 134B relative to the collars 130A", 130B" means that the collars 130A", 130B" could be disassembled from the elongated body 100 and reassembled so that the relative position of the first jack assembly 18A" is switched with that of the second jack assembly 18B". In other words, in one orientation the jack rods 134A, 134B are positioned farther apart, and in a second orientation the jack rods 134A, 134B are positioned closer to one another, even though the respective collars 130A", 130B" are in the same position on the elongated body 100. Further, positioning of the jack rods 134A, 134B on outer side surfaces of the collars 130A", 130B" provides an additional orientation for mounting. Such asymmetries increase the modularity of the engine support system 10 to accommodate different types of engines and/or different types of vehicles.

Figure 3C:
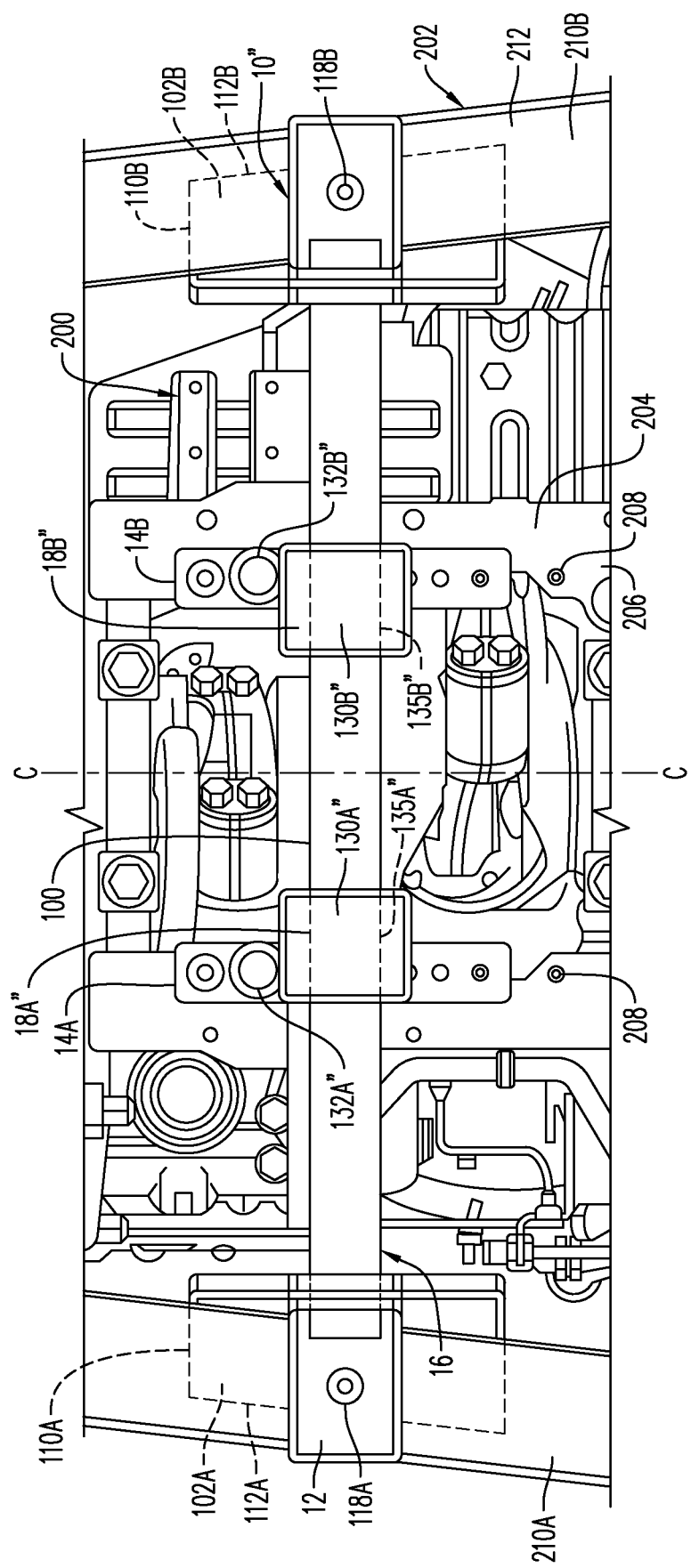
FIG. 3C is a bottom view of the engine support system of FIG. 3A illustrating increased surface area contact between the engine support system and the vehicle frame by tapered edges of flanges of the engine support system.

Referring to FIG. 3C, the first rail 210A and the second rail 210B are angled relative to a center axis C of the vehicle 202. The first flange 110A includes a first edge 112A, which is tapered (e.g., from a front to a back) to increase a contact surface area with the first rail 210A, and the second flange 110B includes a second edge 112B, which is tapered (e.g., from a front to a back) to provide a maximum contact surface area with the second rail 210B.

Figure 3D:
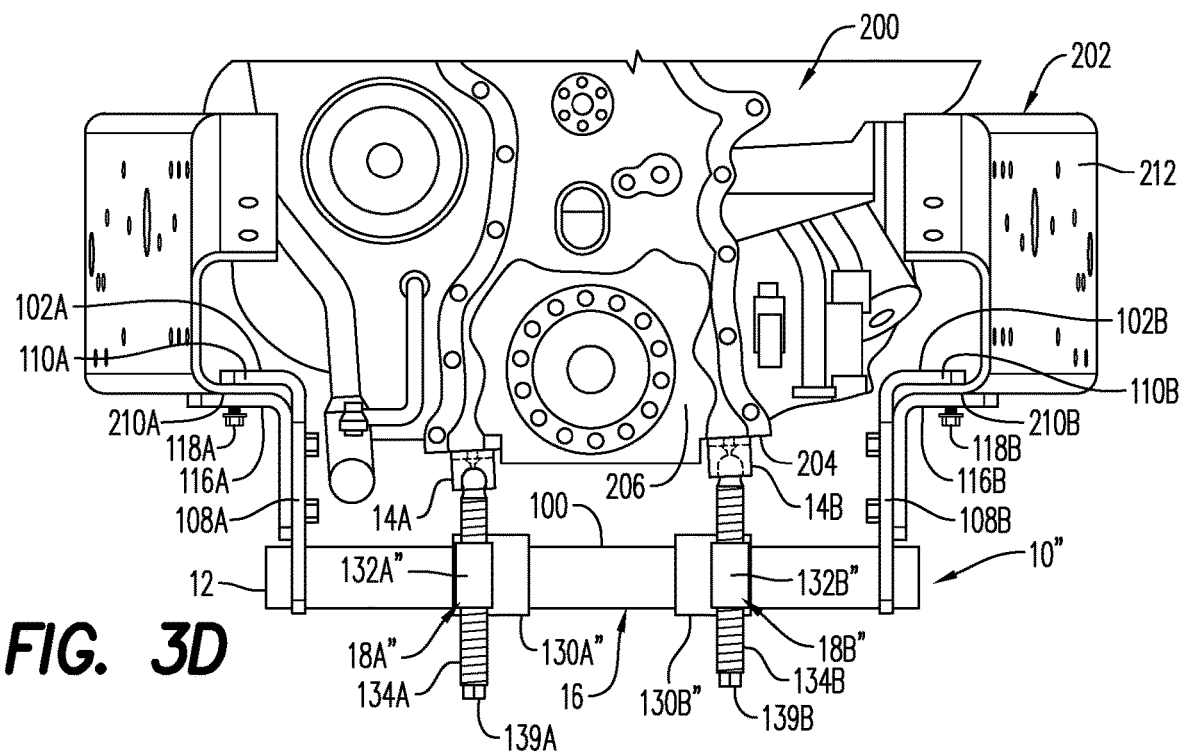
FIG. 3D is a side view of the engine support system of FIG. 3A illustrating jack rods engaged with the couplers.
Figure 3E:
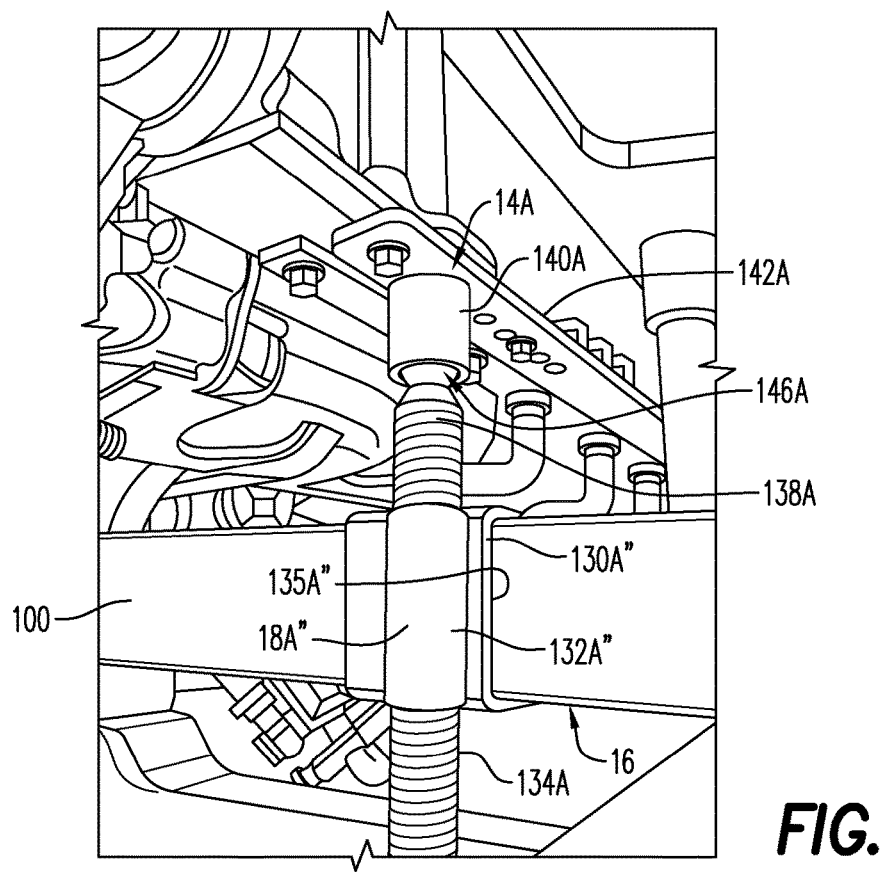
FIG. 3E is a perspective view of the engine support system of FIG. 3A illustrating one of the jack rods engaged with one of the couplers.

Referring to FIGS. 3D-3E, once the jack rods 134A, 134B of the jack assemblies 18A", 18B" are aligned with the openings 146A, 146B of the couplers 14A, 14Ba tool engages the hex caps 139A, 139B of the jack rods 134A, 134B to rotate the jack rods 134A, 134B and move the jack rods 134A, 134B vertically relative to the collars 130A", 130B" and cuffs 132A", 132B" until the ball mounts 138A, 138B are inserted into the openings 146A, 146B of the receptacles 140A, 140B. The spherical shape of the ball mounts 138A, 138B and the oversize of the opening 146A, 146B (e.g., openings 146A, 146B are larger in diameter than the ball mounts 138A, 138B) accommodate rotational variance of the engine 200 (e.g., angled mount of the engine 200 relative to the vehicle frame 212). Further, the angled mount accounts for relative angling of the engine 200 as the jack rods 134A, 134B are iteratively rotated to support and/or lift the engine 200 relative to the vehicle frame 212. For example, to lift the engine level, the first jack rod 134A travels vertically and lifts a first side of the engine 200. Once level, the first jack rod 134A then travels further vertically to lift the first side of the engine 200 higher than the second side. Then the second jack rod 134B travels vertically to lift the second side of the engine 200 higher than the first side. This process repeats until the engine 200 is supported and/or lifted to a desired height relative to the vehicle frame 212.

Accordingly, the jack assemblies 18A", 18B" are configured to support the engine block 206 of the vehicle 202 relative to the vehicle frame 212 by vertical movement of the ball mounts 138A, 138B into the couplers 14A, 14B and relative to the frame mount 16 engaged with the vehicle frame 212. The jack assemblies 18A", 18B" are configured to lift the engine block 206 of the vehicle 202 relative to the frame 212 of the vehicle 202 by vertical movement of the ball mounts 138A, 138B in the couplers 14A, 14B and relative to the frame mount 16 engaged with the vehicle frame 212. Once supported and/or lifted, the engine 200 can be serviced (e.g., removing fly wheel housing, removing transmission, etc.).

Figure 4A:
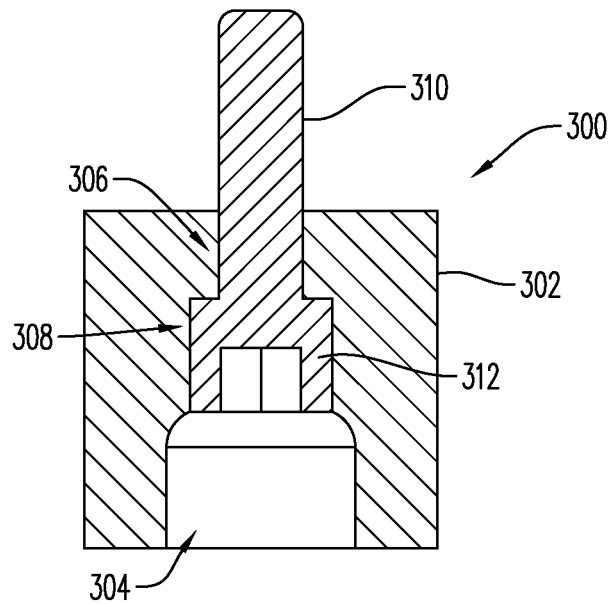
FIG. 4A is a cross-sectional side view of an alternative embodiment of a coupler usable in connection with engine support systems according to the present invention.

FIG. 4A is a cross-sectional side view of an alternative embodiment of the coupler 14A or 14B of FIGS. 1A-1C, 2A, 2I, and 3A-3E. The coupler 300 of FIG. 4A includes a receptacle 302 with an opening 304 at a bottom to receive the ball mounts of the jack rods of the jack assemblies. The receptacle 302 further includes a through hole 306 and a countersink 308 to receive a fastener 310 therein, such that the head 312 of the fastener 310 is positioned in the countersink 308.

Figure 4B:
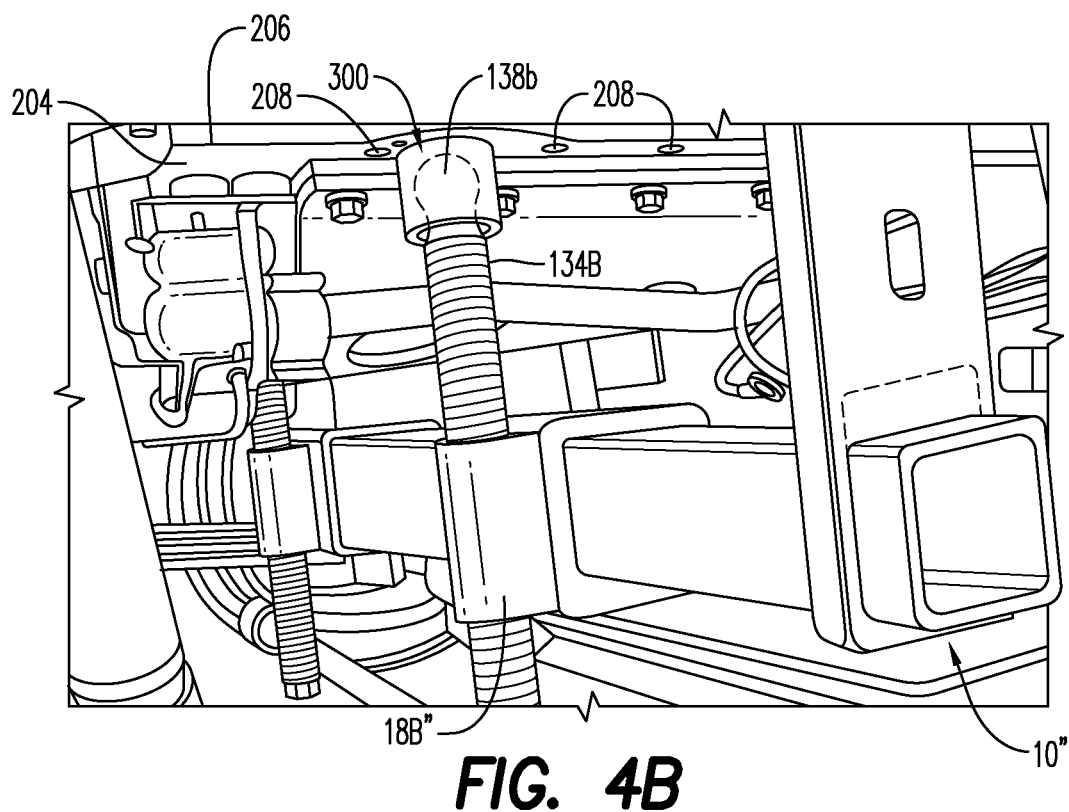
FIG. 4B is a perspective view of the engine support system of FIGS. 3A-3E engaged with the coupler of FIG. 3A.

FIG. 4B is a perspective view of the engine support system 10" of FIGS. 3A-3E engaged with the coupler 300 of FIG. 4A. In particular, the ball mount 138B of the second jack rod 134B of the second jack assembly 18B" is inserted into the coupler 300. It will also be noted that the opening in the arm through which the elongated member extends may be the same size as or, as shown in phantom, vertically higher than the elongated member.

The coupler 300 is universal and only requires one threaded hole 208 in the engine block 206. In other words, for example, the first coupler includes a receptacle defining a through hole 306 (see FIG. 4A) configured to receive a fastener 310 (see FIG. 4A) to removably attach the first coupler 300 to a single threaded hole 208 at the underside 204 of the engine block 206 of the vehicle 202. Accordingly, compared to the coupler 14A or 14B shown in FIGS. 1A-1C, 2A, 2I, and 3A-3E, the coupler 300 increases the flexibility and modularity of mounting.

Figure 5:
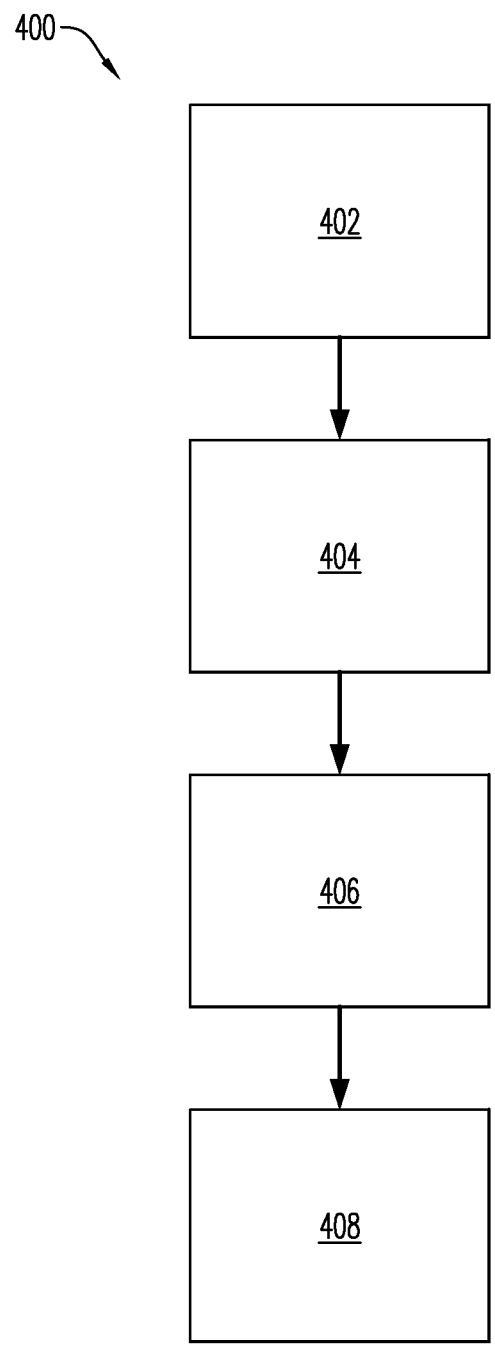
FIG. 5 is a flowchart illustrating a method of supporting an engine of a vehicle using the engine support systems according to aspects of the present invention.

FIG. 5 is a flowchart 400 illustrating a method of supporting an engine 200 of a vehicle 202 using the engine support systems of FIG. 1A-1C, 2A, 3A-3E, or 4A-4B. For purposes of discussion, reference numerals as used in FIGS. 1A-1C are used in describing the method. Step 402 includes suspending a frame mount 416 of an engine support system 10 across a frame 212 of a vehicle 202 beneath an engine block 206 of the vehicle 202 by moving a first arm 102A attached to a first end of an elongated body 100 relative to a second arm 102B attached to a second end of the elongated body 100 to an engaged orientation. In some examples, the method further includes attaching a first clamping jaw 114A to the first arm 102A to position a portion of a first rail 210A of the frame 212 of the vehicle 202 between a first flange 110A of the first arm 102A and a first bracket 116A of the first clamping jaw 114A, and rotating a first clamping bolt 118A in a first threaded hole 128A of the first bracket 116A of the first clamping jaw 114A to clamp the portion of the first rail 210A of the frame 212 of the vehicle 202 between the first flange 110A and the first clamping bolt 118A.

In some examples, the method further includes horizontally sliding a second collar 130B of a second jack assembly 18B of the engine support system 10 along the elongated body 100 to align a ball mount 138B of a second jack rod 134B of the second jack assembly 18B with a second coupler 14B at the underside 204 of the engine block 206 of the vehicle 202. The method further includes engaging the second jack assembly 18B with the engine block 206 by vertically moving the second jack rod 134B of the second jack assembly 18B to insert the ball mount 138B of the second jack assembly 18B into the second coupler 14B of the engine block 206. The method further includes supporting the engine 200 of the vehicle 202 relative to the frame 212 of the vehicle 202 by vertically moving the second jack rod 134B of the second jack assembly 18B to insert the ball mount 138B of the second jack rod 134B of the second jack assembly 18B into the second coupler 14B at the underside 204 of the engine block 206.

Step 404 includes horizontally sliding a first collar 130A of a first jack assembly 18A of the engine support system 10 along the elongated body 100 to align a ball mount 138A of a first jack rod 134A of the first jack assembly 18A with a first coupler 14A at an underside 204 of the engine block 206 of the vehicle 202. In some examples, the method further includes attaching the first coupler 14A to the underside 204 of the engine block 206 of the vehicle 202.

Step 406 includes supporting an engine 200 of the vehicle 202 relative to the frame 212 of the vehicle 202 by vertically moving the first jack rod 134A of the first jack assembly 18A to insert the ball mount 138A of the first jack rod 134A of the first jack assembly 18A into the first coupler 14A at the underside 204 of the engine block 206. Step 408 includes lifting an engine 200 of the vehicle 202 relative to the frame 212 of the vehicle 202 by continued vertical movement of the first jack rod 134A of the first jack assembly 18A.

Figure 6A:
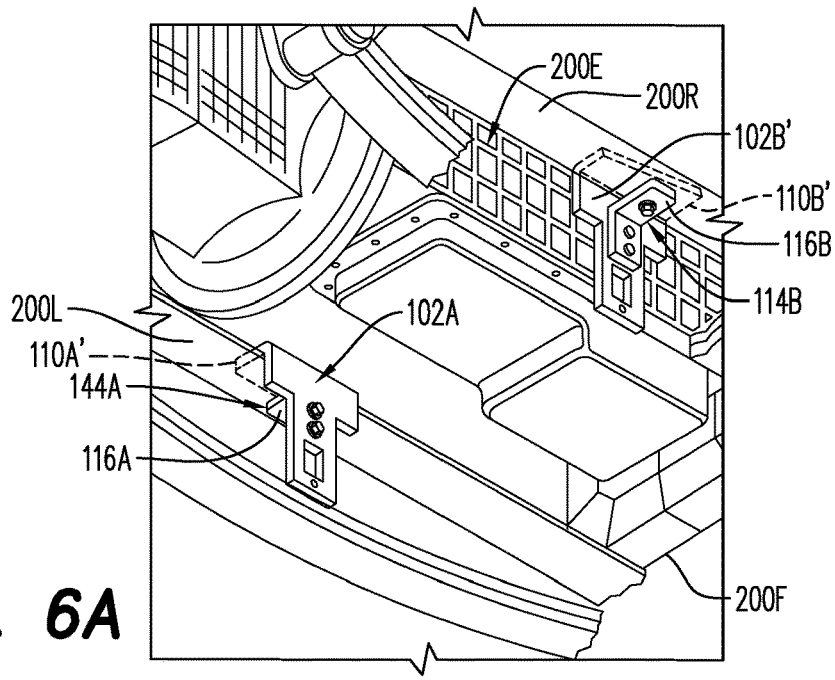
FIG. 6A is a perspective view of first and second arms of the engine support system of FIG. 2A mounted relative to an engine.
Figure 6B:
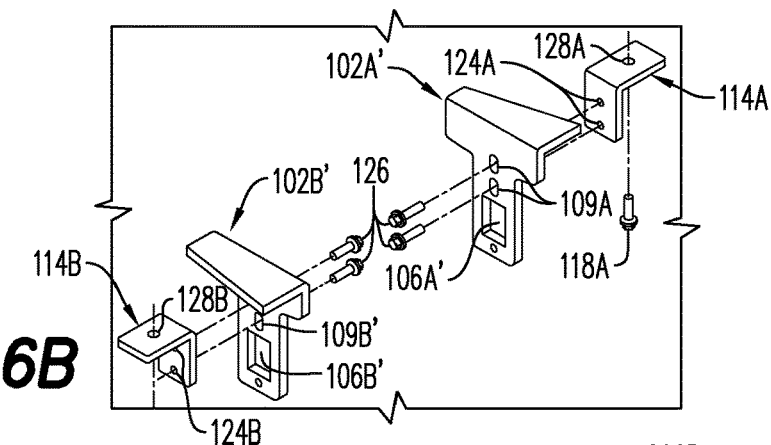
FIG. 6B is an exploded view of first and second arms and first and second clamping jaws of the engine support system of FIG. 2A.

FIGS. 6A-6E illustrate a method of supporting an engine 200E of a vehicle using an engine support system 10' and components as shown in FIG. 2A-2K. As seen in FIG. 6A, the first and second arms 102A' and 102B' are positioned with undersides of their flanges 110A' and 110B' (shown in phantom) on top of left and right rails 210L and 210R, with wide ends of the flanges pointed toward the front 200F of the engine 200E. The first and second clamping jaws 114A and 114B are loosely attached to the arms 102A' and 102B', respectively, with, as seen in FIG. 6B, externally threaded fasteners 126 extending through slots 109A' and 109B' in the first and second arms, respectively, and into internally threaded holes 124A in the first and second clamping jaws, respectively (alternatively, bolts can extend through the slots and into unthreaded holes and can mate with nuts instead of internally threaded holes). As seen in FIG. 6A, top surfaces of the first and second brackets 116A and 116B of the first and second clamping jaws 114A and 114B, respectively, abut the bottom surfaces of the left and right rails 210L and 210R, respectively.

Figure 6C:
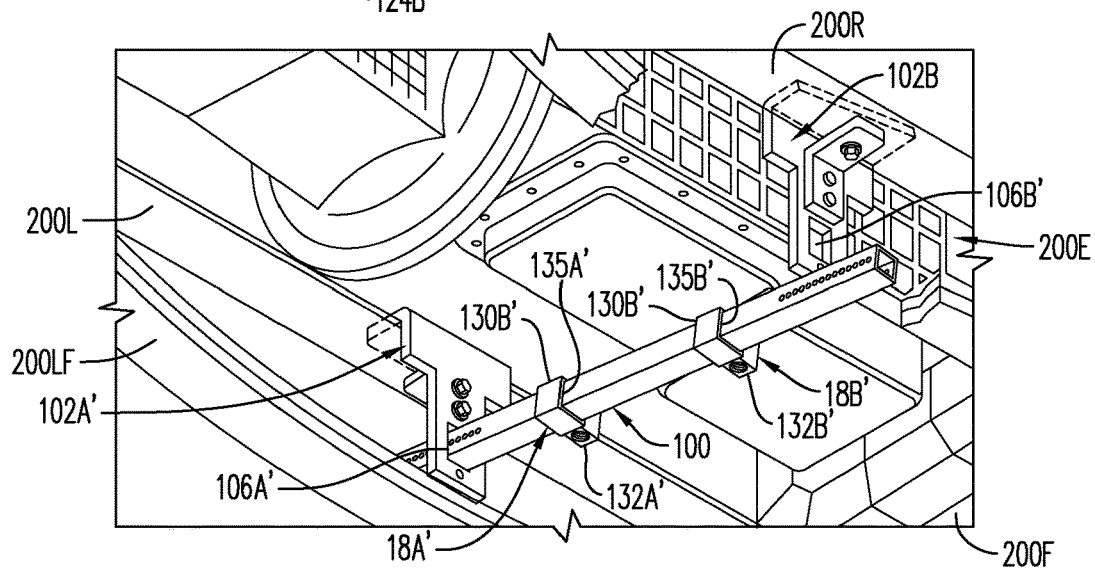
FIG. 6C is a perspective view of an elongated member being initially attached to first and second arms of the engine support system of FIG. 2A.

As seen in FIG. 6C, the elongated member 100 is slid into the openings 135A' and 135B' of the first and second collars 130A' and 130B', respectively, of the first and second jack assemblies 18A' and 18B', respectively, usually prior to threading the jack rods 134A' and 134B' (seen in FIG. 6E) into the threaded holes of the cuffs 132A' and 132B'. Usually after the elongated member 100 is slid into the openings 135A' and 135B' of the first and second collars 130A' and 130B', respectively, of the first and second jack assemblies 18A' and 18B', an end of the elongated member is slid into one of the openings of one of the first and second arms. In FIG. 6C, the end of the elongated member 100 is shown first slid into the opening 106A' of the first arm 102A', however, the end of the elongated member might, alternatively, be first slid into the opening 106B' of the second arm 102B'.

If it is determined that, if the elongated member 100 rests on bottom edges of the openings of the first and second arms, it will be low enough to interfere with a structure on the vehicle, such as a suspension component such as a leaf spring 200LF, a spacer 105 is attached (as shown in FIG. 2K) to the bottom edges each of the openings 106A' and 106B' of the first and second arms 102A' and 102B', respectively, to raise the position of the elongated member 100 relative to the first and second arms to clear the interfering component. The spacers 105 are secured to the arms 102A' and 102B' with pins 103. FIG. 6E illustrates an engine support system 10' with spacers 105.

Figure 6D:
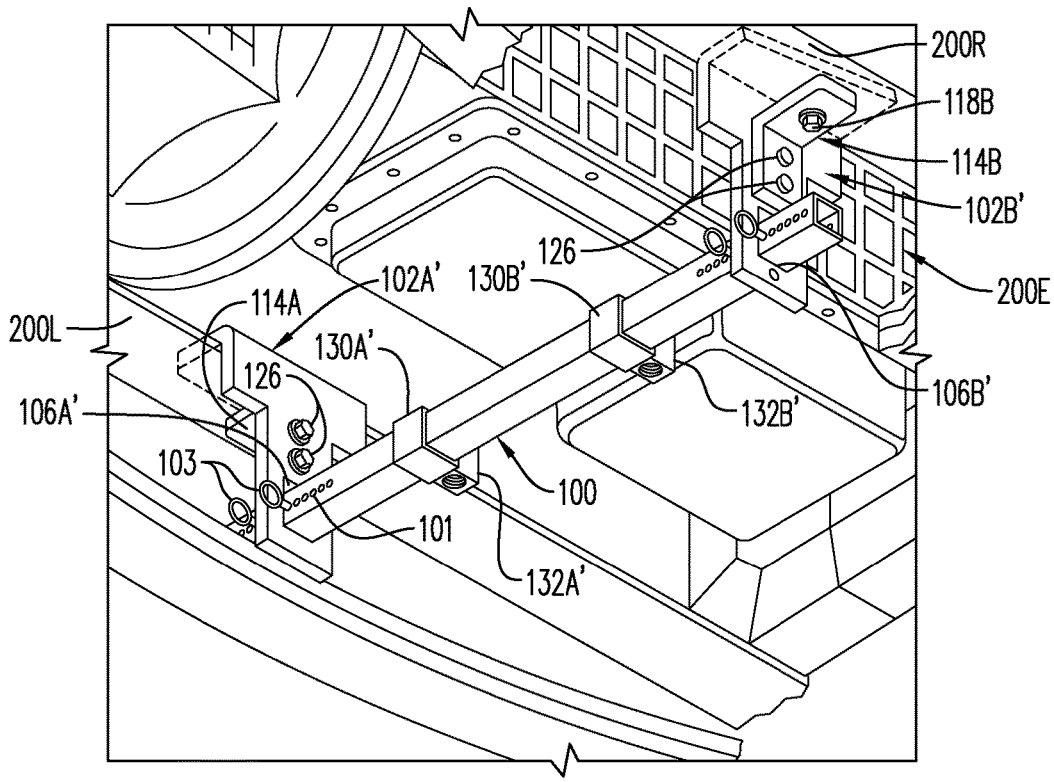
FIG. 6D is a perspective view of an elongated member attached to first and second arms of the engine support system of FIG. 2A.
Figure 6E:
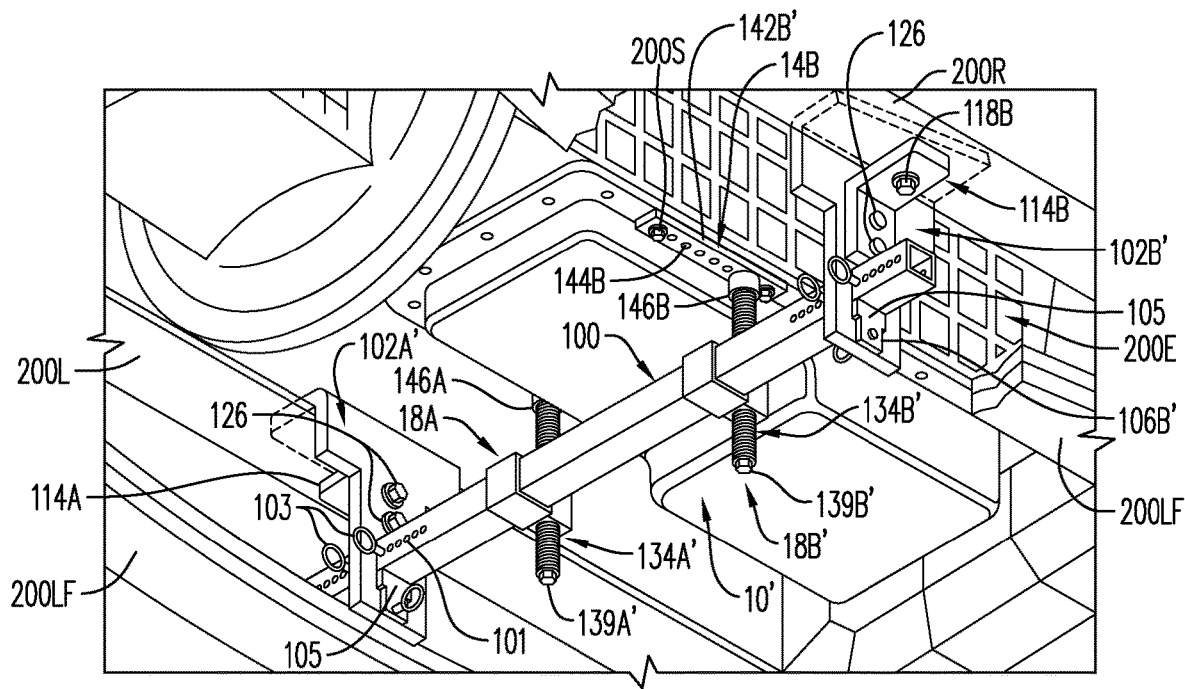
FIG. 6E is a perspective view of the engine support system of FIG. 2A in position to support the engine.

As seen in FIG. 6D, the free end of the elongated member 100 is then slid into the opening of the other one of the first and second arms. In FIG. 6D, the end of the elongated member 100 is shown slid into the opening 106B' of the second arm 102B' after having been first slid into the opening 106A' of the first arm 102A'. If it is known that the first and second arms 102A' and 102B' are properly positioned along the rails 200L and 200R relative to the engine 200E at this point, then the first and second arms are tightly fastened to the first and second clamping jaws 114A and 114B with the fasteners 126 and are secured in place along the length of the elongated member 100 by pins 103 extending through pin holes 101 in the elongated member on opposite sides of the first and second arms.

Usually at this point, as seen in FIG. 6E, the jack rods 134A' and 134B' are threaded into the threaded holes of the cuffs 132A' and 132B', such as by engaging the hex caps 139A' and 139B' with a tool, so that the ball mounts 138A' and 138B' extend above tops of the cuffs. The ball mounts 138A' and 138B' of the jack rods 134A' and 134B', respectively, are inserted into the openings 146A and 146B of the couplers 14A (mostly obscured by engine component in FIG. 6A) and 14B and holes 144A and 144B in the plates 142A and 144B are aligned with holes in the engine, such as holes for an oil pan. To align the holes 144A and 144B in the plates 142A and 142B with desired holes, in the engine, the positions of the first and second jack assemblies 18A' and 18B' along the elongated member 100 may be adjusted and, if necessary, the positions of the first and second arms 102A' and 102B' may be adjusted along the length of the elongated member 100 and along the lengths of the left and right rails 210L and 210R. The first and second jack assemblies 18A' and 18B' and the first and second arms 102A' and 102B' are positioned as desired and, if not already done as shown in FIG. 6D, the first and second arms 102A' and 102B' are tightly fastened to the first and second clamping jaws 114A and 114B with the fasteners 126 and are secured in place along the length of the elongated member 100 by pins 103 extending through pin holes 101 in the elongated member on opposite sides of the first and second arms. A first clamping bolt 118A is screwed into the threaded hole 128A of the first bracket 116A of the first clamping jaw 114A and a second clamping bolt 118B is screwed into the threaded hole 128B of the second bracket 116B of the second clamping jaw 114B to clamp the left rail 210L between the first arm 102A' and the first clamping jaw 114A and the right rail 210R between the second arm 102B' and the second clamping jaw 114B.

The jack rods 134A' and 134B' are further threaded into the threaded holes of the cuffs 132A' and 132B' so that the plates 142A and 142B of the couplers 14A and 14B at the tops of the jack rods touch the engine and the holes 144A and 144B in the plates are aligned with the holes in the engine 200E. The plates 142A and 142B of the couplers 14A and 14B are attached to the engine 200 by screws 200S that extend through the holes 144A and 144B in the plates and mate with threads in the holes in the engine 200E. The jack rods 134A' and 134B' are then further threaded into the threaded holes of the cuffs 132A' and 132B' so that the engine 200E is supported or lifted relative to the vehicle frame by the engine support system 10'.

Those skilled in the art will recognize improvements and modifications to the preferred embodiments of the present disclosure. All such improvements and modifications are considered within the scope of the concepts disclosed herein and the claims that follow.

What is claimed is:

1. An engine support system for a vehicle, comprising:
   a frame mount comprising:
      an elongated body;
      a first arm slidably mounted on the elongated body and configured to releasably engage a first side of a frame of a vehicle; and
      a second arm mounted on the elongated body and configured to releasably engage
   a second side of the vehicle frame;
   a first coupler configured to attach to an engine of the vehicle; and
   a first jack assembly, comprising:
      a first collar slidably mounted on the elongated body and configured to move in a longitudinal direction of the elongated body; and
      a first jack rod coupled to the first collar and configured to move generally perpendicular to the longitudinal direction of the elongated body, the first jack rod comprising a body and a ball mount at an end of the body, the ball mount configured to insert into the first coupler at an underside of an engine block of the vehicle.

2. The engine support system of claim 1, wherein the first coupler is configured to removably attach to the underside of the engine block of the vehicle.

3. The engine support system of claim 1, wherein the first coupler is configured to removably attach to threaded holes configured to mount an oil drip pan to the underside of the engine block of the vehicle.

4. The engine support system of claim 1, wherein the first coupler includes a receptacle defining a through hole configured to receive a fastener to removably attach the first coupler to a single threaded hole at the underside of the engine block of the vehicle.

5. The engine support system of claim 1, wherein the first coupler includes a receptacle fixedly attached to a plate with a plurality of through holes, at least two of the plurality of through holes configured to align with at least two threaded holes at the underside of the engine block of the vehicle.

6. The engine support system of claim 1, wherein the first arm comprises an opening having a non-circular cross-section, the elongated body having a corresponding non-circular cross-section and being received in and non-rotatable relative to the opening.

7. The engine support system of claim 1, wherein the first arm comprises an opening through which the elongated body is adapted to slide.

8. The engine support system of claim 7, wherein the opening has a vertical height in a longitudinal direction of the first arm that is greater than a vertical height of the elongated body.

9. The engine support system of claim 8, further comprising a spacer attachable to the first arm at a bottom of the opening.

10. The engine support system of claim 1, wherein the elongated body has a non-circular cross-section and the first collar has non-circular opening, the elongated body being received in and non-rotatable relative to the first collar.

11. The engine support system of claim 1, wherein the first arm comprises a first flange configured to engage a first upper surface of a first rail of the vehicle frame and the second arm comprises a second flange configured to engage a second upper surface of a second rail of the vehicle frame.

12. The engine support system of claim 11,
   wherein a first edge of the first flange of the first arm is tapered to increase a contact surface area with the first rail angled relative to a center axis of the vehicle; and
   wherein a second edge of the second flange of the second arm is tapered to increase a contact surface area with the second rail angled relative to the center axis of the vehicle.

13. The engine support system of claim 11, wherein the frame mount further comprises:
   a first clamping jaw removably attached to the first arm, the first clamping jaw comprising a first bracket and a first clamping bolt, the first bracket defining a first threaded hole, the first clamping bolt positioned in the first threaded hole and configured to move relative thereto to clamp a portion of the first rail between the first flange and the first clamping bolt; and
   a second clamping jaw removably attached to the second arm, the second clamping jaw comprising a second bracket and a second clamping bolt, the second bracket defining a second threaded hole, the second clamping bolt positioned in the second threaded hole and configured to move relative thereto to clamp a portion of the second rail between the second flange and the second clamping bolt.

14. The engine support system of claim 1, wherein the first jack assembly is configured to lift the engine block of the vehicle relative to the vehicle frame by vertical movement of the jack rod relative to the frame mount engaged with the vehicle frame with the ball mount in the first coupler.

15. The engine support system of claim 1, wherein the body of the first jack rod is threaded.

16. The engine support system of claim 15, wherein the first jack assembly further comprises a first threaded cuff attached to the first collar, the first jack rod positioned within the threaded cuff.

17. The engine support system of claim 15, wherein the first jack assembly further comprises a first threaded cuff fixedly attached to an outer surface of the first collar and offset from a center of the first collar along a center axis of the first collar.

18. The engine support system of claim 1, wherein the first collar is U-shaped.

19. The engine support system of claim 1, wherein the second arm is slidably mounted on the elongated body.

20. The engine support system of claim 19, wherein the second arm comprises an opening having a non-circular cross-section, the elongated body having a corresponding non-circular cross-section and being received in and non-rotatable relative to the opening.

21. The engine support system of claim 1,
wherein the first jack assembly is configured to engage the first coupler at a first side of the engine block of the vehicle;
wherein the engine support system further comprises a second jack assembly configured to engage a second coupler at a second side of the engine block of the vehicle, comprising:
 a second collar slidably mounted on the elongated body and configured to move in a longitudinal direction of the elongated body; and
 a second jack rod threadably coupled to the second collar and configured to move generally perpendicular to the longitudinal direction of the elongated body, the second jack rod comprising a second body and a second ball mount at an end of the second body, the second ball mount configured to insert into the second coupler at the underside of the engine block of the vehicle.

22. The engine support system of claim 1, wherein the first arm, the second arm, and the first collar are removably mounted on the elongated body.

23. A method of supporting an engine of a vehicle, comprising:
 suspending a frame mount of an engine support system across a frame of a vehicle beneath an engine block of the vehicle by moving a first arm slidably attached to an elongated body relative to a second arm attached to the elongated body to an engaged orientation;
 sliding a first collar of a first jack assembly of the engine support system in a longitudinal direction of the elongated body to align a ball mount of a first jack rod of the first jack assembly with a first coupler at an underside of the engine block of the vehicle; and
 supporting an engine of the vehicle relative to the vehicle frame by moving the first jack rod of the first jack assembly generally perpendicular to the longitudinal direction of the elongated body to insert the ball mount of the first jack rod of the first jack assembly into the first coupler at the underside of the engine block.

24. The method of claim 23, further comprising lifting an engine of the vehicle relative to the vehicle frame by continued movement of the first jack rod of the first jack assembly.

25. The method of claim 23, further comprising attaching the first coupler to the underside of the engine block of the vehicle.

26. The method of claim 23, further comprising:
 attaching a first clamping jaw to the first arm to position a portion of a first rail of the vehicle frame between a flange of the first arm and a first bracket of the first clamping jaw; and
 rotating a first clamping bolt in a first threaded hole of the first bracket of the first clamping jaw to clamp the portion of the first rail of the vehicle frame between the first flange and the first clamping bolt.

27. The method of claim 23, further comprising:
 sliding a second collar of a second jack assembly of the engine support system in the longitudinal direction of the elongated body to align a ball mount of a second jack rod of the second jack assembly with a second coupler at the underside of the engine block of the vehicle; and
 supporting the engine of the vehicle relative to the vehicle frame by vertically moving the second jack rod of the second jack assembly to insert the ball mount of the second jack rod of the second jack assembly into the second coupler at the underside of the engine block.

28. The method of claim 23, wherein suspending the frame mount of the engine support system across the frame of the vehicle beneath the engine block of the vehicle further comprises moving the second arm relative to the elongated body to an engaged orientation.

29. The method of claim 23, comprising sliding the elongated body relative to the first arm by moving the elongated body through an opening in the first arm.

30. The method of claim 29, wherein the opening has a vertical height in a longitudinal direction of the first arm that is greater than a vertical height of the elongated body, the method comprising supporting the elongated body on a bottom of the opening.

31. The method of claim 30, comprising changing a vertical height of the opening by attaching a spacer to the first arm at a bottom of the opening, the elongated body being supported on the bottom of the opening on top of the spacer.

* * * * *